Patented Feb. 24, 1942

2,274,555

UNITED STATES PATENT OFFICE 2,274,555

POLYVINYL HALIDE

Archie B. Japs, Cuyahoga Falls, Ohio, assignor to The B. F. Goodrich Company, New York, N. Y., a corporation of New York No Drawing. Application December 4, 1937, Serial No. 178,114

8 Claims. (Cl. 260—36)

This invention relates to polyvinyl halides, and has as its object to provide heat- and light-stable polyvinyl halide compositions as hereinafter described.

Polyvinyl halides have found many useful applications because of their extraordinary resistance to oxidation, organic solvents, acids, alkalies, and other deteriorating influences. Compositions containing polyvinyl halides, however, have frequently tended to discolor in the course of the heat treatment required for molding them or after exposure to natural or artificial light for periods of time, which darkening was apparently caused by some fundamental change in the composition.

I have discovered that the heat- and light-stability of polyvinyl halides is greatly increased by the incorporation therein of a member of the class consisting of esters of unsaturated fatty acids with monohydric alcohols. Any type of polyvinyl halide such as alpha, beta, delta, and gamma polyvinyl chloride, polyvinyl bromide, or even polyvinyl halide compositions formed by the conjoint polymerization of a vinyl halide such as vinyl chloride and a vinyl ester of an aliphatic acid such as vinyl acetate may be stabilized with the materials of this invention. Since the plasticized gamma polyvinyl chlorides described in U. S. Patent No. 1,929,453 issued to Waldo L. Semon show the greatest commercial promise, the invention will be described in detail with reference to these materials, though it is to be understood that the invention is equally applicable to other polyvinyl halides as set forth above.

The stabilizer may be added at any time during the polymerization of the vinyl chloride or the plasticization of the same, though it is preferably added before the composition is heat molded. A small proportion of the stabilizer, from .1% to 5% by weight based on the plasticized composition for instance, may conveniently be dissolved in the plasticizer, if the two are compatible, and added to the composition therewith. Thus 3 parts by weight of butyl oleate are dissolved in 43 parts of tricresyl phosphate. This mixture is incorporated with 57 parts of gamma polyvinyl chloride in a heated internal mixer or on a heated roll mill. Alternately, the plasticized composition may be prepared and the stabilizer added on the mill. Irrespective of the method of preparation, the resulting composition is much more resistant to heat and light discoloration than a similar composition containing no stabilizer. Other stabilizers include butyl ricinoleate, butyl linoleate, butyl linolenate, butyl erucate, etc., as well as the corresponding methyl, ethyl, isopropyl, amyl, and cyclohexyl compounds. Aromatic esters such as phenyl ricinoleate and tolyl ricinoleate, as well as benzyl ricinoleate are within the scope of this invention. The plasticizers herein described may accordingly be defined as esters of unsaturated fatty acids with compounds containing the structural formula ROH wherein R represents a hydrocarbon group. In those cases in which the unsaturated fatty acid contains a hydroxyl group, it is sometimes advisable to esterify the hydroxyl group as well as the carboxyl group, preferably with a relatively low-molecular-weight fatty acid such as acetic acid. Compounds thus produced, such as butyl acetyl-ricinoleate, cyclohexyl acetyl-ricinoleate and phenyl acetyl-ricinoleate, are among the most useful materials for the purposes of this invention.

Incorporation of esters of unsaturated fatty acids with monohydric alcohols in larger proportions than those necessary to stabilize the compositions imparts thereto improved low-temperature flexibility. Compositions plasticized with ordinary plasticizers such as tricresyl phosphate, dibutyl phthalate, butyl phthalyl butyl glycollate, etc., rapidly lose their flexibility at temperatures below freezing, and when low enough temperatures are reached, they become so hard and brittle that they are easily cracked. On the other hand, a composition containing gamma polyvinyl chloride 57 parts, tricresyl phosphate 21.5 parts, and butyl acetyl ricinoleate 21.5 parts is flexible at −55° C., and even below that temperature it does not readily break.

Although compositions containing only gamma polyvinyl chloride and unsaturated fatty esters of monohydric alcohols may be prepared, the stabilizers of this invention are rather poor plasticizers and more resilient products are obtained when they are used together with other compounds which are better plasticizers. The esters of this invention may be used in proportions up to about twice the weight of plasticizer used, however, to produce rubbery compositions which retain their flexibility at very low temperatures.

The compositions of this invention may contain, besides the stabilizer, carbon black, zinc oxide, barytes, clay, wood flour, and other pigments and fillers commonly used in the rubber and plastics industries. The polyvinyl halides may also contain appreciable amounts of polyvinyl esters of aliphatic acids either conjointly polymerized therewith or incorporated therewith after polymerization.

Though I have herein disclosed specific embodiments of my invention, I do not intend to limit the invention solely thereto, for it is obvious that many modifications including substituting equivalent materials and varying the proportions of materials used are within the scope of the appended claims.

I claim:

1. A heat- and light-stable plasticized gamma polyvinyl chloride composition containing a plasticizer and in addition from .1% to 5% of a different material which is an ester of an unsaturated fatty acid containing an eighteen-carbon chain with a compound having the formula ROH wherein R represents a hydrocarbon group containing from one to seven carbon atoms.

2. A heat- and light-stable plasticized gamma polyvinyl chloride composition containing a plasticizer and in addition from .1% to 5% of a different material, namely, butyl acetyl ricinoleate.

3. A heat- and light-stable gamma polyvinyl chloride composition having good low-temperature flexibility, said composition containing a plasticizer and in addition a different material which is an ester of an unsaturated fatty acid containing an eighteen-carbon chain with a compound of the structural formula ROH wherein R represents a hydrocarbon group, said ester being present in an amount not over twice the weight of the plasticizer.

4. A heat- and light-stable gamma polyvinyl chloride composition having good low-temperature flexibility, said composition containing a plasticizer and in addition a different material which is a butyl ester of an unsaturated fatty acid containing an eighteen-carbon chain, said ester being present in an amount not over twice the weight of the plasticizer.

5. A heat- and light-stable gamma polyvinyl chloride composition having good low-temperature flexibility, said composition containing a plasticizer and in addition a different material, namely, butyl acetyl ricinoleate, said butyl acetyl-ricinoleate being present in an amount not over twice the weight of the plasticizer.

6. A heat- and light-stable gamma polyvinyl chloride composition having good low-temperature flexibility, said composition containing a plasticizer and in addition a different material, namely, cyclohexyl acetyl-ricinoleate, said cyclohexyl acetyl-ricinoleate being present in an amount not over twice the weight of the plasticizer.

7. A heat- and light-stable gamma polyvinyl chloride composition having good low-temperature flexibility, said composition containing a plasticizer and in addition a different material which is a phenyl ester of an unsaturated fatty acid containing an eighteen-carbon chain, said ester being present in an amount not over twice the weight of the plasticizer.

8. A heat- and light-stable gamma polyvinyl chloride composition having good low-temperature flexibility, said composition containing a plasticizer and in addition a different material, namely, phenyl acetyl-ricinoleate, said phenyl acetyl-ricinoleate being present in an amount not over twice the weight of the plasticizer.

ARCHIE B. JAPS.